(12) United States Patent
Sobolev et al.

(10) Patent No.: US 8,898,647 B2
(45) Date of Patent: Nov. 25, 2014

(54) METHOD AND APPARATUS FOR TEST COVERAGE ANALYSIS

(75) Inventors: Sergey Pavlovich Sobolev, Saint-Petersburg (RU); Sergey Valerievich Vinogradov, Saint-Petersburg (RU)

(73) Assignee: Siemens Aktiengesellschaft, Munich (DE)

( * ) Notice: Subject to any disclaimer, the term of this patent is extended or adjusted under 35 U.S.C. 154(b) by 329 days.

(21) Appl. No.: 13/123,625

(22) PCT Filed: Oct. 9, 2008

(86) PCT No.: PCT/RU2008/000643
§ 371 (c)(1),
(2), (4) Date: Apr. 11, 2011

(87) PCT Pub. No.: WO2010/041973
PCT Pub. Date: Apr. 15, 2010

(65) Prior Publication Data
US 2011/0197098 A1 Aug. 11, 2011

(51) Int. Cl.
*G06F 9/44* (2006.01)
*G06F 9/45* (2006.01)
*G06F 11/36* (2006.01)

(52) U.S. Cl.
CPC .................. *G06F 11/3676* (2013.01)
USPC ............ 717/130; 717/132; 717/156; 717/158

(58) Field of Classification Search
CPC ... G06F 11/3466; G06F 11/3688; G06F 8/20; G06F 8/433; G06F 8/443; G06F 11/3676
See application file for complete search history.

(56) References Cited

U.S. PATENT DOCUMENTS

| | | | | |
|---|---|---|---|---|
| 5,651,111 A * | 7/1997 | McKeeman et al. | ......... | 714/38.1 |
| 6,430,741 B1 * | 8/2002 | Mattson et al. | ................ | 717/154 |
| 6,668,372 B1 * | 12/2003 | Wu | ................................ | 717/130 |
| 6,748,584 B1 * | 6/2004 | Witchel et al. | ................ | 717/136 |
| 7,120,906 B1 * | 10/2006 | Stephenson et al. | .......... | 717/158 |
| 7,386,838 B2 * | 6/2008 | Schmidt | ........................ | 717/130 |
| 8,196,119 B2 * | 6/2012 | Gill et al. | ...................... | 717/130 |
| 8,291,399 B2 * | 10/2012 | Li et al. | ........................ | 717/158 |
| 8,484,623 B2 * | 7/2013 | Li et al. | ........................ | 717/132 |
| 8,739,145 B2 * | 5/2014 | Li et al. | ........................ | 717/156 |
| 2008/0263505 A1 * | 10/2008 | StClair et al. | ................ | 717/101 |
| 2009/0249306 A1 * | 10/2009 | Li et al. | ...................... | 717/130 |

OTHER PUBLICATIONS

Kim et al., Diverge-Merge Processor (DMP): Dynamic Predicated Execution of Complex Control-Flow Graphs Based on Frequently Executed Paths, Dec. 2006, 12 pages.*
Jiang et al., Context-aware statistical debugging: from bug predictors to faulty control flow paths, Nov. 2010, 10 pages.*

(Continued)

*Primary Examiner* — Thuy Dao
(74) *Attorney, Agent, or Firm* — King & Spalding L.L.P.

(57) ABSTRACT

A method provides for a way to test coverage data used in testing small computing platforms by assigning unique signatures to each node in the control flow graph and embedding control function calls. Signatures are embedded into the program during compilation time using the custom parser. When the program is executed the "exercised" signatures sequence is checked for correctness and used for deriving test coverage metric. This metric is used for improving unit and black-box tests. Thus, a way to collect the path-based test coverage with minimal memory and code/size impact on target system is provided.

12 Claims, 5 Drawing Sheets

(56) References Cited

OTHER PUBLICATIONS

Testwell CTC++, Test Coverage Analyzer toe C/C++, www.testwell.fi/ctcdesc.html, 9 pages, printed Apr. 28, 2008.

The Manual for CoverageMeter, Code Coverage Measurement for C/C++, CoverageMeter Software Factory, www.coveragemeter.com/manual.html, 56 pages, Jun. 5, 2008.

International PCT Search Report, PCT/RU2008/000643, 11 pages, mailed Jul. 2, 2009

Cornet, S., "Code Coverage Analysis", www.bullseye.com /coverage.html, 11 pages, Jun. 5, 2008.

Majzik, I., et al., "Control Flow Checking in Multitasking System", Periodica Polytechnica Ser. Electrical Engineering, vol. 39, No. 1, pp. 27-36, 1995.

LDRA: Technical Description of the LDRA Testbed, Software Quality Tools Suite, Ashling, Microsystems, Inc., www.ashling.com/technicalarticles/APB201-TestbedDescription.pdf, pp. 1-26, 2000.

The tool suite Cantara++ v.5.2.1, Technical brief IPL., www.iplbath.com/products/tools/pt400.uk.php; 2 pages, Jun. 5, 2008.

Wu, X., et al., "Coverage-Based Testing on Embedded Systems", Automation of Software Test, AST '07, Second International Workshop of IEEE, 6 pages, May 20, 2007.

* cited by examiner

METHOD AND APPARATUS FOR TEST COVERAGE ANALYSIS

CROSS-REFERENCE TO RELATED APPLICATIONS

This application is a U.S. National Stage Application of International Application No. PCT/RU2008/000643 filed Oct. 9, 2008, which designates the United States of America. The contents of which are hereby incorporated by reference in their entirety.

TECHNICAL FIELD

The present invention relates to a method and an apparatus for test coverage analysis for testing small computer platforms like embedded systems. More specifically, the present invention is directed to a method and an apparatus for test coverage analysis having a transfer of coverage data from a target to a host computer.

BACKGROUND

Development of high integrity and mission-critical software systems requires the rigorous and efficient testing techniques. Even more challenging task is to ensure high quality requirements within embedded computing systems where different resources constraints exist. White-box testing techniques, such as code coverage analysis is, partially meet these challenges but its application is very often associated with additional load on target systems and thus achievable in far from real environments. Either it is hard to get the required thoroughness of analysis without stressing target system too much.

A lot of test coverage analysis tools already exist. Most of the already known tools in this field addressing basically the following problems:
1. Application of test coverage analysis in testing of embedded software in real environment.
2. Support of hardware with strict computing resources constraints.
3. Providing more thorough coverage metric than statement and decision coverage with reasonable efforts.
4. Achieving the higher trustworthiness of coverage data with checking of program flow correctness.
5. Semi-automatic execution of test coverage measurement.

The paper Cornett, S., Code Coverage Analysis, [5 Jun. 2008] gives a complete description of code coverage analysis or test coverage analysis. BullseyeCoverage tool which is proposed requires the file system functionality on target and thus cannot be used for simpler applications.

From the publication Testwell CTC++, Test Coverage Analyzer for C/C++, [5 Jun. 2008].

A system is known which supports communication interfaces for transferring coverage data from target to host but still requires operating system functionality on target.

The Manual for CoverageMeter, Code Coverage Measurement for C/C++, CoverageMeter Software Factory, [5 Jun. 2008] provides the state-of-the-art code coverage technique (source code analysis, instrumentation, generation of application), but still requires operating system functionality on target.

The tool suite Cantata++v.5.2.1, Technical brief, IPL, [5 Jun. 2008], along with other testing features is capable to perform integrated coverage analysis. It declares the possible communication of results data from target to host platform by means of serial, LAN, USB, JTAG. This tool does not require file I/O on the target platform but exact significant memory resources from target.

The publication Majzik I., Pataricza A. Control Flow Checking in Multitasking Systems//Periodica Polytechnica Ser. Electrical Engineering, Vol. 39, No. 1, pp 27-36, 1995 shows a new watchdog-processor method SETS (Signature Encoded Instruction Stream) and the part of the method responsible for instrumentation is based on a Assigned Signature Scheme.

None of the listed coverage analysis tools fully addresses the problems mentioned above. First, all known tools do not provide the coverage metric reporting on decisions interaction which contains potential bugs not discovered by other coverage metrics. Program flow correctness check is not provided by these tools as well. None of the tools provides instrumentation granularity up to a program basic block.

SUMMARY

According to various embodiments, software assigned signatures are used and a database of syntactically correct software paths which are described by means of signatures tree is created. As a result, the control flow coverage data is derived and analyzed. The various embodiments can basically be seen as an enhanced source code instrumentation and a online sending and processing of signatures, when target application does not store the executed signatures and just sends it to host. In this method the coverage criterion is more thorough than statement and decision coverage since it reports on covered/uncovered paths through control flow graph. Reducing the number of paths to test is achieved by using only one level of nodes connection to check (successor-predecessor) during source code instrumentation. It makes mostly performance impact to the target application and minimizes code/data size overhead of the target code/data memory.

The main advantages are a coverage analysis for small computing systems for example with no operating system, small memory or no file and network support; a robust and comprehensive coverage criterion which considers decision interaction in program code; a program flow correctness check, which proves the obtained coverage data has been the result of correct program's behavior and a granularity of instrumentation which is configurable, so certain modules, functions or even basic blocks can be instrumented or left out of coverage analysis.

BRIEF DESCRIPTION OF THE DRAWINGS

The accompanying drawings, which are incorporated into and constitute a part of this specification, illustrate one or more embodiments and, together with the detailed description, serve to explain the principles and implementations.

In the drawings.

DETAILED DESCRIPTION

In the Interest of clarity, not all of the routine features of the implementation described herein are shown described.

Figure 1:
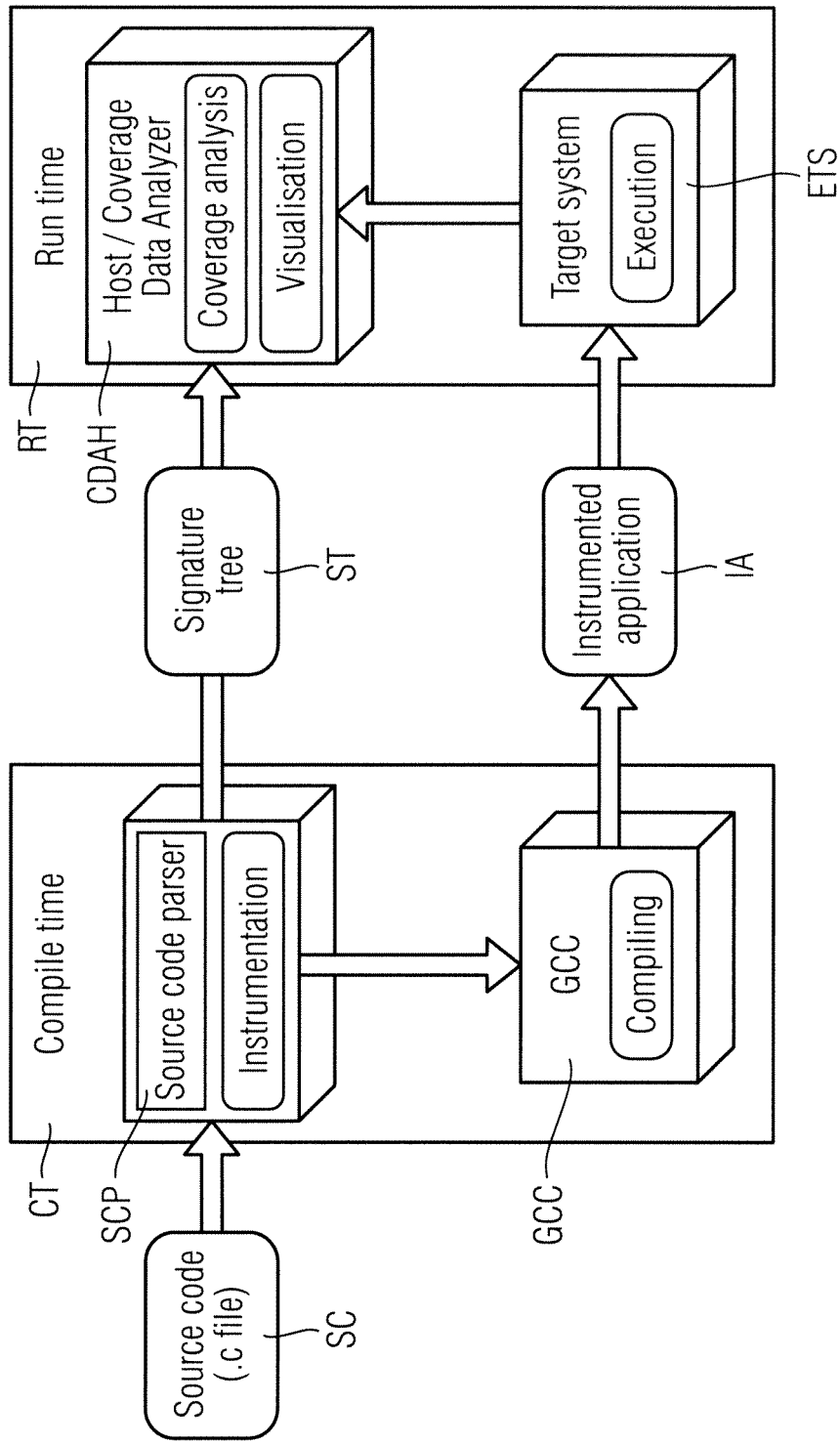
FIG. 1 is a general tooling and workflow diagram.

FIG. 1 is showing the basic structure according to various embodiments and depicts a block CT with steps being executed during compile time and a further block RT with further steps being executed during runtime.

Within the block CT—in other words during compile time—a block SCP for a source code parser handling the instrumentation and a block GCC for the compiling is shown.

During the compile-time part of the method an instrumented application IA and a signature tree ST is created out of a source code SC.

Within the block RT—in other words during run time—a first block ETS is shown, which stands for the execution of the instrumented application IA on the target system, and a second block CDAH stands for a coverage data analyzer on the host computer which is providing a coverage analysis visualization.

Figure 2:
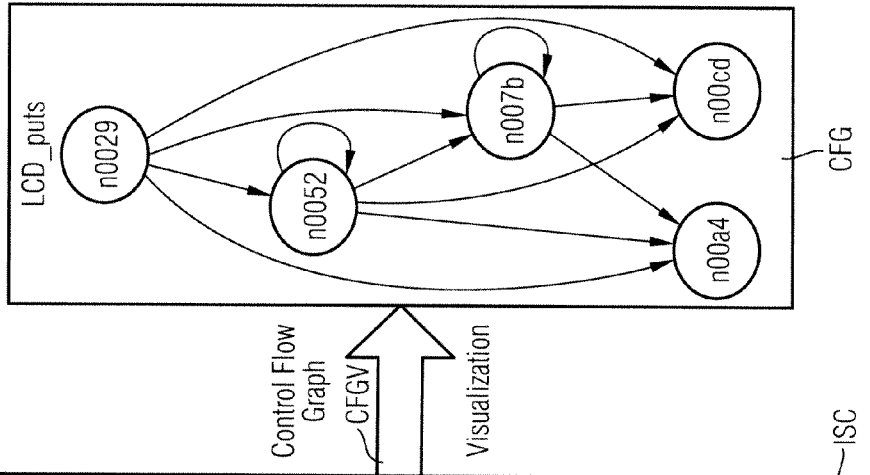
FIG. 2 is a diagram illustrating the source code transformation phase according to various embodiments.

The diagram of FIG. 2 is illustrating the source code transformation phase according to various embodiments with the step PI of preprocessing & instrumentation of the source code SC and the step CFGV of control graph visualization producing the control flow graph CFG. Herein the inserted "send_signature"—commands (in bold letters) become apparent.

Figure 3:
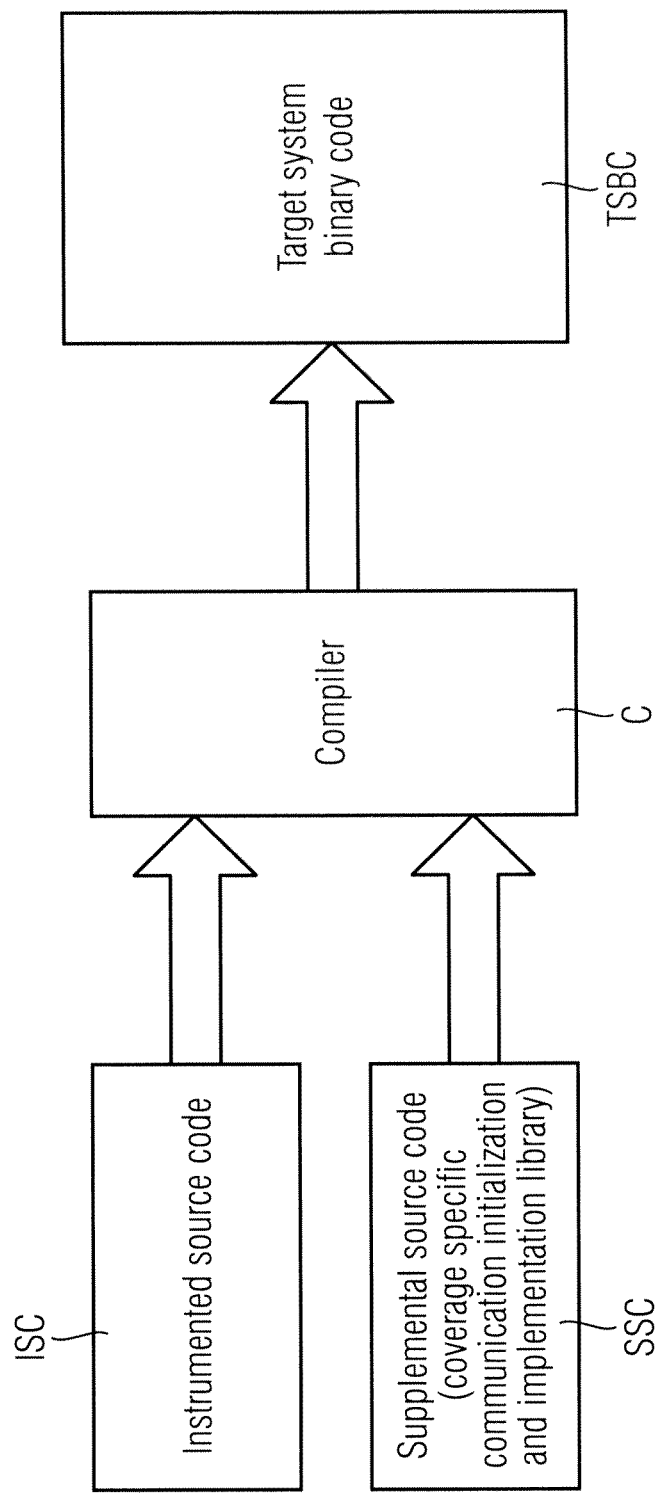
FIG. 3 is a diagram illustrating the target system binary code generation phase according to various embodiments.

FIG. 3 is a diagram illustrating a target system binary code generation phase according to various embodiments. In this phase the compiler C is generating binary code TSBC on the target system out of the instrumented source code ISC and supplemental source code SSC like coverage specific communication initialization and implementation library.

Figure 4:
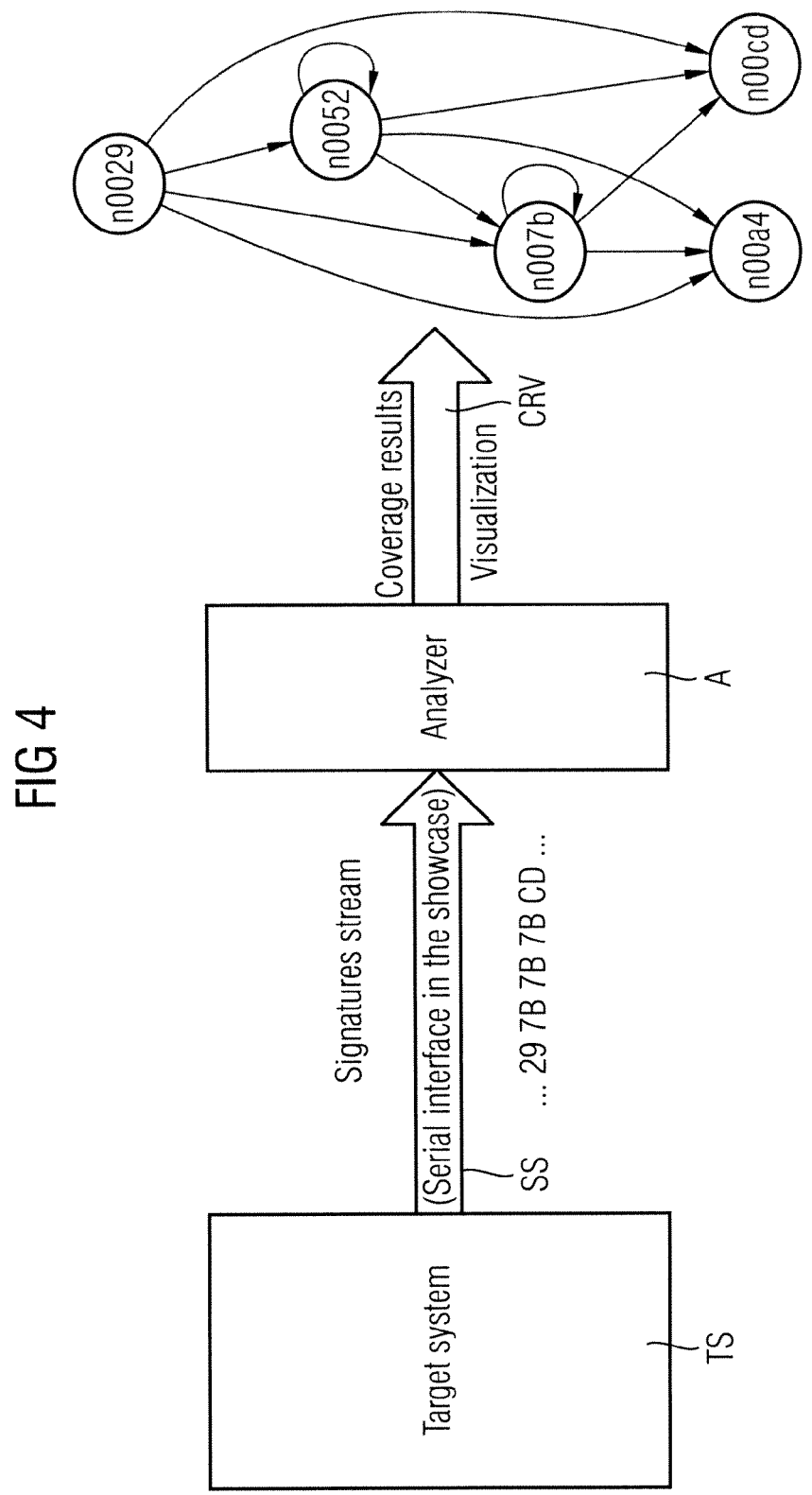
FIG. 4 is a diagram illustrating target system execution and coverage analysis phase according to various embodiments.

FIG. 4 is a diagram illustrating a target system execution and coverage analysis phase according to various embodiments. In this phase the analyzer A is providing coverage results visualization CRV using a signatures stream SS which comes from the target system TS. The analyzer A has control flow information extracted at the instrumentation level. This is implemented by the use of a serialized control flow graph, which is given as an argument to the analyzer.

Figure 5:
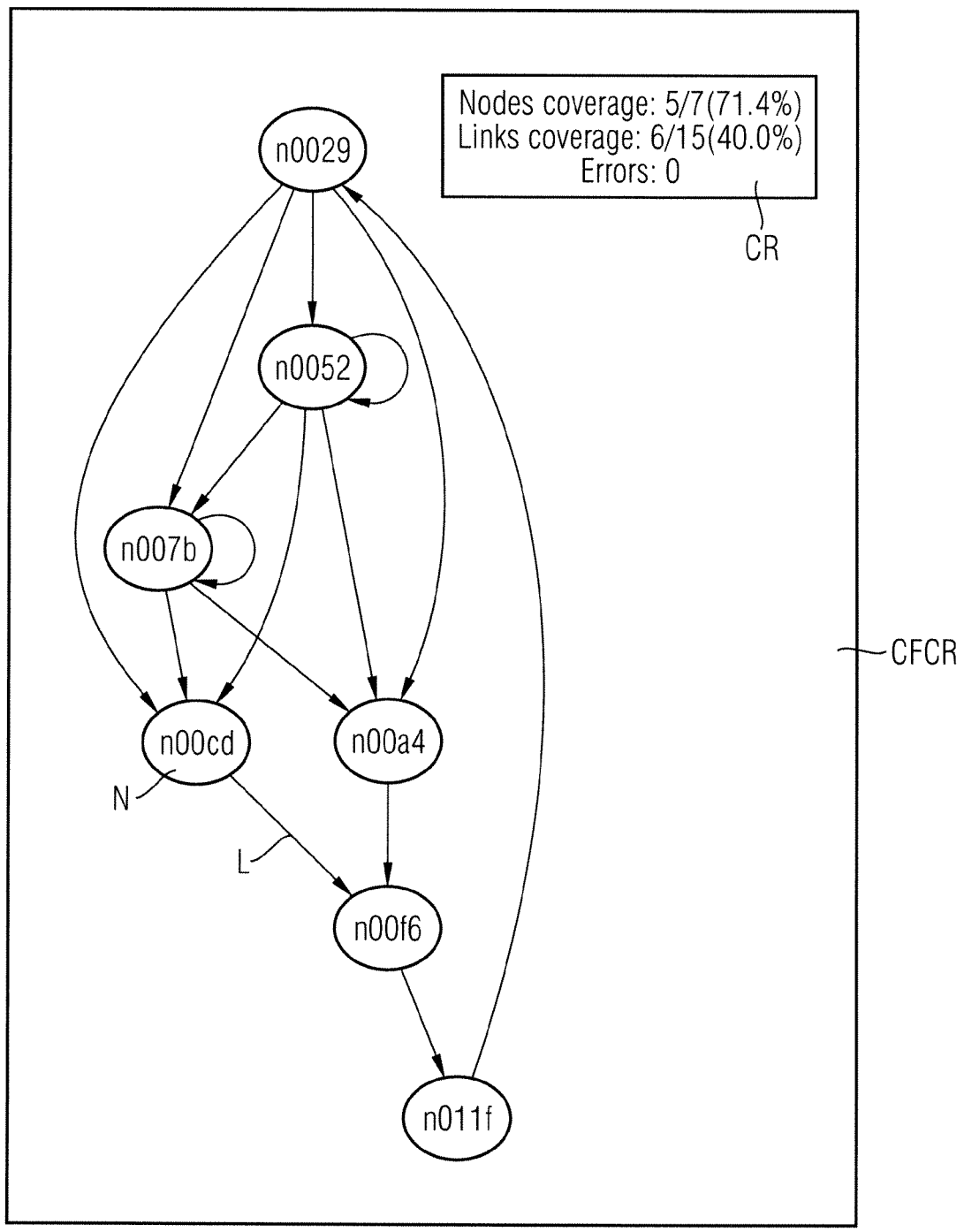
FIG. 5 is a flow diagram illustrating the control flow coverage results according to various embodiments.

The flow diagram FIG. 5 is illustrating the control flow coverage results CFCR according to various embodiments. Preferably different colors indicate on the one hand covered links L or nodes N and on the other hand not covered possible links or nodes.

Along with graphical representation of the coverage results CR the overall statistics can be optionally shown.

Compile Time
1. Preprocess source files (using GNU C preprocessor).
2. Identify basic blocks and language constructions (using source code custom parser), put signatures and link them according to syntactically allowable program flow.

Run Time
1. Run the instrumented application on the target with one or more as required test scenarios.
2. Download signatures of "exercised" source code from target to host PC.
3. Analyze sequence of "exercised" signatures: compare it with the original signature tree and collect coverage statistics.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method for conducting test coverage analysis comprising:
   generating an enhanced source code instrumentation, wherein an instrumented code and a signature tree are generated during a compile time, the instrumented code including send signatures and the signature tree including a database of syntactically correct software paths; and
   processing the send signatures during a runtime, wherein a target application including the instrumented code executes and sends the processed send signatures to a host system where the processed send signatures are used in connection with the signature tree to analyze code coverage in a control flow graph.

2. The method of claim 1, wherein generating the enhanced source code instrumentation includes assigning all basic blocks and language constructions with send signatures during the compile time and creating an original signature tree during the compile time which describes a database of syntactically correct software paths.

3. The method of claim 2, wherein processing the send signatures comprises:
   running the instrumented code on the target system with at least one test scenario during the runtime;
   downloading executed send signatures from the target system to the host system during the runtime; and
   analyzing a stream of executed send signatures during the runtime by comparing the stream of executed send signatures with the original signature tree and collecting coverage statistics.

4. The method of claim 1, wherein processing of send signatures comprises:
   running the instrumented code on the target system with at least one test scenario during the runtime;
   downloading executed send signatures from the target system to the host system during the runtime; and
   analyzing a stream of executed send signatures during runtime by comparing the stream of executed send signatures with the signature tree and collecting coverage statistics.

5. An apparatus for conducting test coverage analysis, comprising:
   a source code parser stored in non-transitory computer-readable media and programmed to generate an enhanced source code instrumentation including an instrumented code and a signature tree during a compile time, the instrumented code including send signatures, and the signature tree including a database of syntactically correct software paths;
   a compiler stored in non-transitory computer-readable media and programmed to translate the instrumented code into an instrumented binary code for execution by a target system including the instrumented code to generate executed send signatures; and
   an analyzer stored in non-transitory computer-readable media on a host system and programmed to, during a runtime, receive the executed send signatures from the target system and analyze code coverage in a control flow graph using the received executed send signatures in connection with the signature tree from the source code parser.

6. The apparatus of claim 5, wherein generating the enhanced source code includes assigning all basic blocks and language constructions with send signatures during the compile time and creating an original signature tree during the compile time which describes a database of syntactically correct software paths.

7. The apparatus of claim 6, wherein the apparatus is programmed to:
   run the instrumented code on the target system with at least one test scenario during runtime;

receive executed send signatures from the target system to the host system during runtime; and analyze the received stream of executed send signatures during runtime by comparing the stream of executed send signatures with the original signature tree and collecting coverage statistics.

8. The apparatus of claim 5, wherein the apparatus is programmed to:

run the instrumented code on the target system with at least one test scenario during runtime;

receive executed send signatures from the target system to the host system during runtime; and analyze the received stream of executed send signatures during runtime by comparing the stream of executed send signatures with the signature tree and collecting coverage statistics.

9. A system including a computer program product for conducting test coverage analysis, the computer program produce including instructions stored in non-transitory machine-readable media and executable by at least one processor to:

generate an enhanced source code instrumentation, wherein an instrumented code and a signature tree are generated during a compile time, the instrumented code including send signatures and the signature tree including a database of syntactically correct software paths; and process the send signatures during a runtime, wherein a target application including the instrumented code executes and sends the processed send signatures to a host system where the processed send signatures are used in connection with the signature tree to analyze code coverage in a control flow graph.

10. The system of claim 9, wherein generating the enhanced source code includes assigning all basic blocks and language constructions with send signatures during the compile time and creating an original signature tree during the compile time which describes a database of syntactically correct software paths.

11. The system of claim 10, wherein said sending and processing of send signatures is programmed to:

run the instrumented code on the target system with at least one test scenario during the runtime;

receive executed send signatures from the target system to the host system during the runtime; and analyze a stream of executed send signatures during runtime by comparing the stream of executed send signatures with the original signature tree and collecting coverage statistics.

12. The system of claim 9, wherein said sending and processing of send signatures is programmed to:

run the instrumented code on the target system with at least one test scenario during the runtime;

receive executed send signatures from the target system to the host system during the runtime; and analyze a stream of executed send signatures during runtime by comparing the stream of executed send signatures with the signature tree and collecting coverage statistics.

* * * * *